Patented Apr. 26, 1932

1,855,319

UNITED STATES PATENT OFFICE

ROBERT EMANUEL SCHMIDT, OF ELBERFELD, AND ROBERT BERLINER, OF VOHWINKEL, NEAR COLOGNE, GERMANY, ASSIGNORS TO GENERAL ANILINE WORKS, INC., OF NEW YORK, N. Y., A CORPORATION OF DELAWARE

CONDENSATION PRODUCTS OF THE ANTHRAQUINONE SERIES CONTAINING THE RADICLE OF FORMALDEHYDE IN A STABLE LINKAGE

No Drawing. Application filed November 28, 1925, Serial No. 72,030, and in Germany December 9, 1924.

The present invention relates to new condensation products of the anthraquinone series containing the radicle of formaldehyde in a stable linkage and to a process of preparing same.

In our co-pending application Serial No. 72,031, filed on November 28, 1925, it is shown that, by causing one to two molecules of formaldehyde to react in a sulfuric acid solution of about 70–85% strength at a temperature of about 30–100° C. upon one molecule of a 1-amino-anthraquinone compound being substituted in the 4-position, new condensation products are obtained. It is, furthermore, shown that these condensation products belong to two different types. Thus, when causing one molecule of formaldehyde to react upon one molecule of the anthraquinone compounds, condensation products are obtained in which the radicle of one molecule of formaldehyde is linked in a stable linkage to one molecule of the anthraquinone compound. On the other hand, when causing more than one molecule of formaldehyde to react upon one molecule of the anthraquinone compound,—as for instance two molecules of formaldehyde,—condensation products are obtained in which the radicle of one molecule of formaldehyde is linked in a stable linkage, whereas the excess of formaldehyde is attached to the nucleus by a less firm linkage. The compounds of the first type we shall name hereafter "type 1 compounds", whereas the compounds of the second type will be named "type 2 compounds".

In our application Serial No. 72,031, furthermore, it is stated that the compounds of type 2 are transformed by oxidation into well characterized intermediate products which, when treated with water, lose the loosely bound formaldehyde and are converted into the compounds of type 1.

We have now found that all these condensation products can be oxidized further, and that in this way new and valuable products are obtained, being vat dyestuffs having remarkable fastness properties.

The oxidation can be carried out in concentrated sulfuric acid of various strengths with manganese dioxid, lead peroxid, etc. Boric acid can be added where concentrated sulfuric acid is used as the medium in which the oxidation is performed. Heating in sulfuric acid alone effects oxidation whereby the sulfuric acid is reduced; this action can be magnified by the catalytic action of small amounts of oxygen-carriers such as mercury oxid, selenic acid etc. Oleum can also be used as an oxidant, the reaction occurring at lower temperatures than with sulfuric acid.

Both types of the condensation products described in the application Serial No. 72,031 can be subjected to this oxidation process. Those of the second type are probably at first oxidized to the products of the first type, in which process the additional formaldehyde contained is eliminated, the oxidation then proceeds further in the same manner as when starting directly from the type 1 compound. This is confirmed by the fact that oxidation of type 2 compounds requires a larger amount of oxidant and when using concentrated sulfuric acid alone a much higher temperature to obtain the same results as with type 1 compound, but the oxidation products as obtained from either type are the same.

Our novel oxidation products are of a quinonic nature, they are converted by reducing agents such as sulfurous acid, into compounds which are easily oxidized to form the initial products. Our novel quinonic-oxidation products are however much more stable than the so-called anthradiquinones or quinoneimids of the anthraquinone series; recrystallization from suitable solvents produces same without any decomposition in form of beautiful crystals. Both the quinonic and the reduced form are adapted to the dyeing of vegetable or other fibers; however, no formula can be given at the present time, since the chemical constitution of the condensation products described in Serial No. 72,031 is uncertain.

Our new oxidation products are generally well crystallized bluish-green powders, soluble in concentrated sulfuric acid with reddish-violet to bright green colors. They are reduced by alkaline hydrosulfite solutions to reddish-violet vats from which cotton is dyed violet shades which become by oxidation grayish-blue to black and show very good fastness to light and washing.

The following examples will further illustrate our invention, the parts being by weight, but we wish it understood that our invention is not limited to the particular materials or conditions described in these examples.

*Example I.*—10 parts of the condensation product type 1 as described in Example 2 of British Patent 244,462 of 1927, and 6 parts of boric acid are dissolved in 400 parts 96% sulfuric acid. The dull olive-colored solution as produced is cooled to 6–10° C. and while stirring a suspension of 3 parts 85% artificial manganese dioxid in 130 parts of concentrated sulfuric acid is introduced into it. The color of the solution changes to a beautiful bluish-green. The oxidation product is obtained in a crystalline form as follows: the sulfuric acid melt is filtered through asbestos so as to get rid of eventually unreacted manganese dioxid. 300 parts of the filtered oxidation melt are then filtered with 1500 parts 96% sulfuric acid and the whole is while stirring, but without cooling, drowned in 2700 parts of water. A deep bluish-red solution is obtained out of which the oxidation product separates rapidly as beautiful crystals, which after cooling are filtered off, washed to neutrality and dried. The so obtained oxidation product is soluble in concentrated sulfuric acid with a reddish-violet color which on addition of boric acid turns bluish-green. This solution shows a characteristic absorption spectrum. The product is also easily soluble in relatively diluted say 50%, sulfuric acid with a fuchsine red color.

The product can be obtained in its reduced (hydro or leuco) form by pouring the oxidation melt prepared as above, into a sulfurous acid or alkali metal bisulfite solution, boiling, filtering and washing the greenish-blue precipitate. This compound is soluble in concentrated sulfuric acid with a green color. Such solutions, particularly when of low concentration of the compound, gradually turn violet even at ordinary temperatures, the sulfuric acid reoxidizing the compound. This oxidation occurs rapidly even for all concentrations when heated on the water bath. The oxidation product as well as the compound, are reduced by alkaline hydrosulfite to a reddish-violet vat, from which cotton is dyed violet shades, which by oxidation turn to an intense grayish-blue to black, particularly fast to washing and light.

*Example II.*—10 parts of the same starting material as used in Example I are dissolved in 400 parts 96% sulfuric acid cooled to 6–10° and a suspension of 3 parts of manganese dioxid in 130 parts of sulfuric acid is added. The greenish-olive color of the solution turns slate-blue. The reaction is completed when a sample poured into 50% sulfuric acid gives a clear fuchsine red solution. The melt is diluted further with concentrated sulfuric acid, drowned in water and the oxidation product recovered as in Example I. It is identical with that obtained in Example I.

*Example III.*—10 parts of the condensation product type 2, as described in Example I of British Patent 244,462 of 1927 are dissolved in 400 parts of sulfuric acid and cooled to 10–14° C. A suspension of manganese dioxid in concentrated sulfuric acid is then run in, while stirring. The color of the solution turns first brown, indicating the formation of an intermediate oxidation product. On further addition of the manganese dioxid suspension the color turns a greyish-olive. The reaction is complete when a sample poured into 50% sulfuric acid gives a clear fuchsine red solution. The oxidation product is isolated as in Example I, and is identical with that obtained there.

*Example IV.*—10 parts of the finely ground condensation product used as starting material in Example I are suspended in 400 parts 60% sulfuric acid and while stirring a suspension of manganese dioxid in sulfuric acid of the same concentration is run in until a clear fuchsine red solution is obtained. The solution is diluted further, the oxidation product crystallizing out and is isolated in the usual way. It is identical with the product of Example I.

*Example V.*—10 parts of the starting material of Example I are dissolved in 1000 parts of concentrated sulfuric acid and heated to 130° C. The olive color of the solution turns gradually blue and then violet with evolution of sulfur dioxid. The reaction is complete when the color does not change any more. The oxidation product is isolated as described in Example I and is identical with the product obtained therein.

*Example VI.*—10 parts of the condensation product used as starting material in Example III are dissolved in 1000 parts of concentrated sulfuric acid. It is in this case necessary to heat to 170–180° C. to complete the oxidation, as indicated by the change of color to violet. The product is again identical with that of Example I.

Whereas, in the examples, only the oxidation products derived from 1-4-amino-hydroxy-anthraquinone are described, we wish it to be understood that the corresponding products derived from 1-4-diamino-anthraquinone, or 1-4-amino-methoxy-anthraquinone, or other 1-amino-anthraquinone compounds being substituted in the 4-position, can be oxidized in the same way and that similar products are obtained thereby. The oxidation products derived from 1-4-diamino-anthraquinones, for instance, dissolve in concentrated, sulfuric acid with a bright green color.

We claim:

1. As new products well crystallized bluish to green powders having linked in a stable linkage the radicle of one molecule of formaldehyde to one molecule of a 1-amino-anthraquinone compounds substituted in 4-position by an amino- or hydroxy group, being chemically of a quinonic structure and giving a leuco compound which is easily reconverted into the original oxidation product, soluble in concentrated sulfuric acid with reddish-violet to bright green colors which change to bluish-green by the addition of boric acid and which are reduced by alkaline hydrosulfite solutions to form violet vats from which cotton is dyed violet shades which on oxydation become grayish-blue to black and show excellent fastness properties, particularly to light and washing.

2. As a new product a well crystallized greenish powder having linked in a stable linkage the radicle of one molecule of formaldehyde to one molecule of 1-4-amino-hydroxy-anthraquinone, being chemically probably of a quinonic structure and giving a leuco-compound which is easily reconverted into the original oxidation product. soluble in 50% sulfuric acid with a fuchsine red color, soluble in concentrated sulfuric acid with a reddish-violet color, which turns bluish-green on addition of boric acid, and which is reduced by alkaline hydrosulfite to form a violet vat from which cotton is dyed a violet shade which on oxidation turns to a grayish-blue, particularly fast to light and washing.

3. In processes of producing new condensation products of the anthraquinone series containing the radicle of formaldehyde in a stable linkage, the step comprising oxidizing the compounds obtainable by causing one to two molecules of formaldehyde to react upon one molecule of a 1-amino-anthraquinone compound substituted in 4-position by an amino- or hydroxy group in a sulfuric acid solution of 70-85% strength, at a temperature of about 30° to 100° C., oxidation being continued until the vat dyestuffs having linked in a stable linkage the radicle of one molecule of formaldehyde to one molecule of a 1-amino-anthraquinone compound have formed.

4. In processes of producing new condensation products of the anthraquinone series containing the radicle of formaldehyde in a stable linkage, the step comprising oxidizing in a sulfuric acid solution with an oxidizing metal oxide the compounds obtainable by causing one to two molecules of formaldehyde to react upon one molecule of a 1-amino-anthraquinone compound substituted in 4-position by an amino- or hydroxy group in a sulfuric acid solution of 70-85% strength at a temperature of about 30° to 100° C., oxidation being continued until the vat dyestuffs having linked in a stable linkage the radicle of one molecule of formaldehyde to one molecule of a 1-amino-anthraquinone compound have formed.

5. In processes of producing new condensation products of the anthraquinone series containing the radicle of formaldehyde in a stable linkage, the step comprising oxidizing in a sulfuric acid solution with manganese dioxide the compounds obtainable by causing one to two molecules of formaldehyde to react upon one molecule of a 1-amino-anthraquinone compound substituted in 4-position by an amino- or hydroxy group in a sulfuric acid solution of 70-85% strength at a temperature of about 30° to 100° C., oxidation being continued until the vat dyestuffs having linked in a stable linkage the radicle of one molecule of formaldehyde to one molecule of a 1-amino-anthraquinone compound have formed.

6. In processes of producing new condensation products of the anthraquinone series containing the radicle of formaldehyde in a stable linkage, the step comprising oxidizing the compound obtainable by causing one molecule of formaldehyde to react upon one molecule of 1-4-amino-hydroxy-anthraquinone in a sulfuric acid solution of 70-85% strength at a temperature of about 30° to 100° C., oxidation being continued until the vat dyestuff having linked in a stable linkage the radical of one molecule of formaldehyde to one molecule of 1-amino-4-hydroxy-anthraquinone has formed.

7. In processes of producing new condensation products of the anthraquinone series containing the radicle of formaldehyde in a stable linkage, the step comprising oxidizing in a sulfuric acid solution with an oxidizing metal oxide the compound obtainable by causing one molecule of formaldehyde to react upon one molecule of 1-4-amino-hydroxy-anthraquinone in a sulfuric acid solution of 70-85% strength at a temperature of about 30° to 100° C., oxidation being continued until the vat dyestuff having linked in a stable linkage the radical of one molecule of formaldehyde to one molecule of 1-amino-4-hydroxy-anthraquinone has formed.

8. In processes of producing new condensation products of the anthraquinone series containing the radicle of formaldehyde in a stable linkage, the step comprising oxidizing in a sulfuric acid solution with manganese dioxide the compound obtainable by causing one molecule of formaldehyde to react upon one molecule of 1-4-amino-hydroxy-anthraquinone in a sulfuric acid solution of 70-85% strength at a temperature of about 30° to 100° C., oxidation being continued until the vat dyestuff having linked in a stable linkage the radical of one molecule of formaldehyde to one molecule of 1-amino-4-hydroxy-anthraquinone has formed.

9. In processes of producing new condensation products of the anthraquinone series containing the radicle of formaldehyde in a stable linkage, the step comprising oxidizing the compound obtainable by causing two molecules of formaldehyde to react upon one molecule of a 1-4-amino-hydroxy-anthraquinone in a sulfuric acid solution of 70–85% strength at a temperature of about 30° to 100° C., oxidation being continued until the vat dyestuff having linked in a stable linkage the radicle of one molecule of formaldehyde to one molecule of 1-amino-4-hydroxy-anthraquinone has formed.

10. In processes of producing new condensation products of the anthraquinone series containing the radicle of formaldehyde in a stable linkage, the step comprising oxidizing in a sulfuric acid solution with an oxidizing metal oxide the compound obtainable by causing two molecules of formaldehyde to react upon one molecule of a 1-4-amino-hydroxy-anthraquinone in a sulfuric acid solution of 70–85% strength at a temperature of about 30° to 100° C., oxidation being continued until the vat dyestuff having linked in a stable linkage the radicle of one molecule of formaldehyde to one molecule of 1-amino-4-hydroxy-anthraquinone has formed.

11. In processes of producing new condensation products of the anthraquinone series containing the radicle of formaldehyde in a stable linkage, the step comprising oxidizing in a sulfuric acid solution with manganese dioxide the compound obtainable by causing two molecules of formaldehyde to react upon one molecule of a 1-4-amino-hydroxy-anthraquinone in a sulfuric acid solution of 70–85% strength at a temperature of about 30° to 100° C., oxidation being continued until the vat dyestuff having linked in a stable linkage the radicle of one molecule of formaldehyde to one molecule of 1-amino-4-hydroxy-anthraquinone has formed.

In testimony whereof we have hereunto set our hands.

ROBERT EMANUEL SCHMIDT.
ROBERT BERLINER.